Feb. 12, 1952 — J. L. BREESE — 2,585,431
METERING VALVE FOR LIQUID FUEL BURNERS
Filed Oct. 5, 1946 — 3 Sheets-Sheet 2
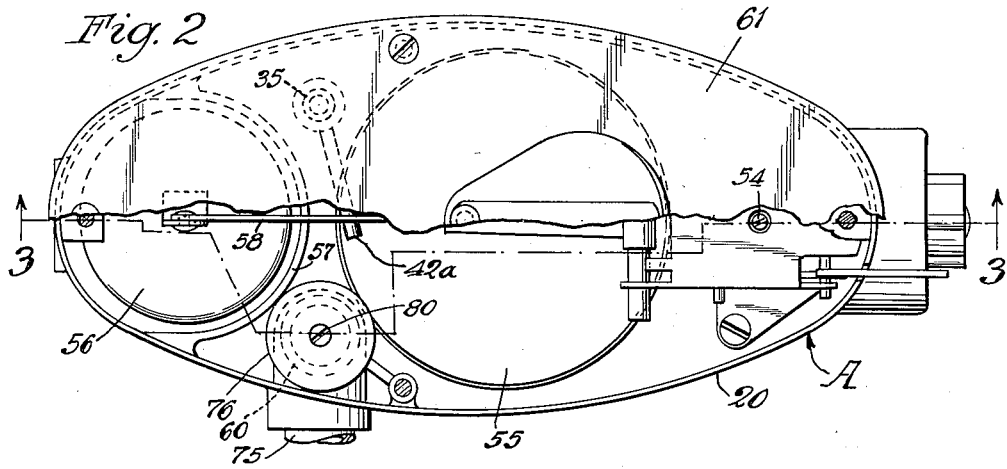
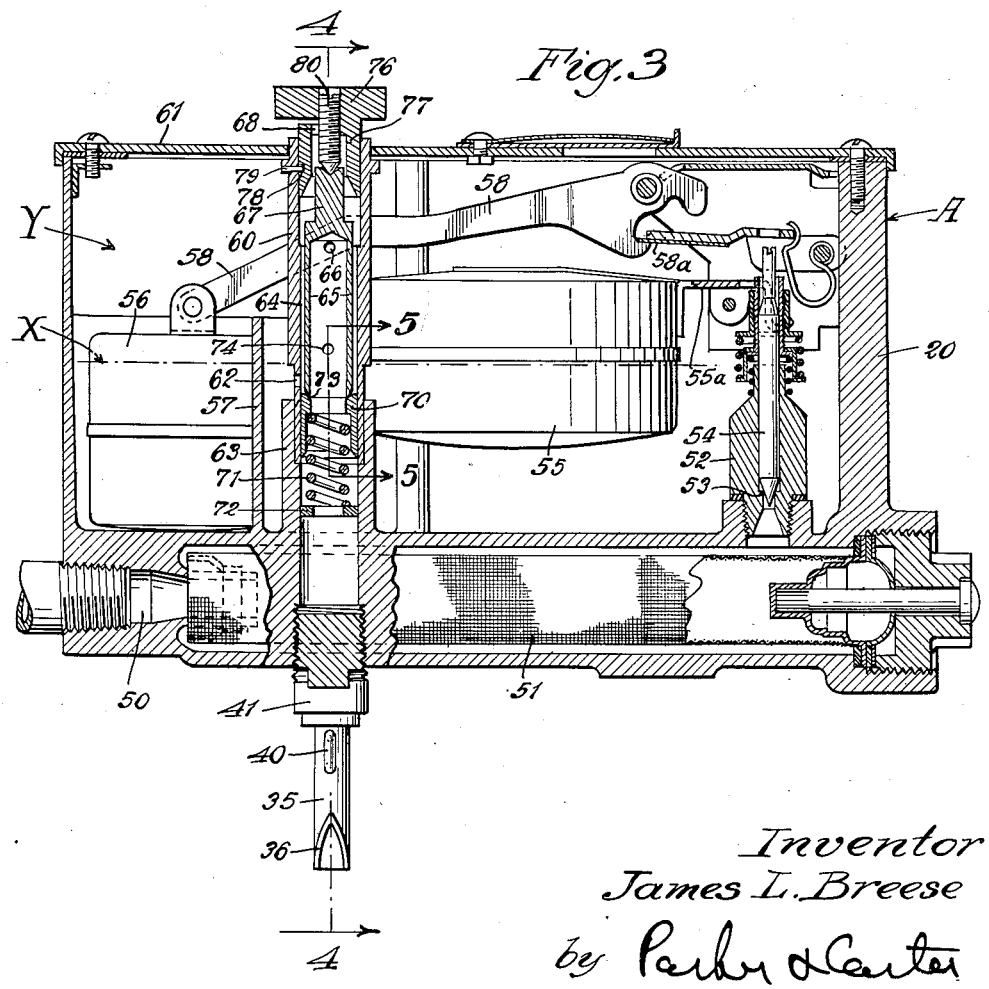
Inventor
James L. Breese Feb. 12, 1952 J. L. BREESE 2,585,431
METERING VALVE FOR LIQUID FUEL BURNERS
Filed Oct. 5, 1946 3 Sheets-Sheet 3
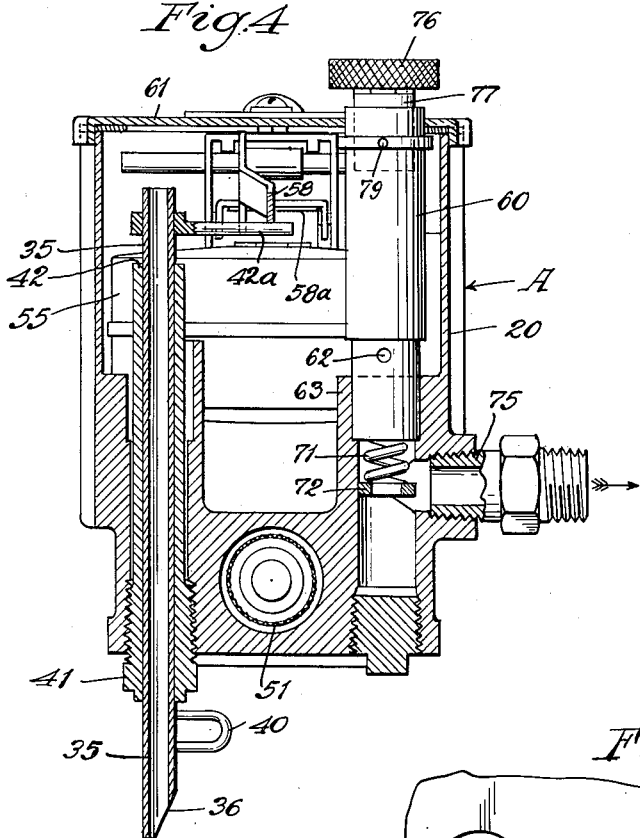
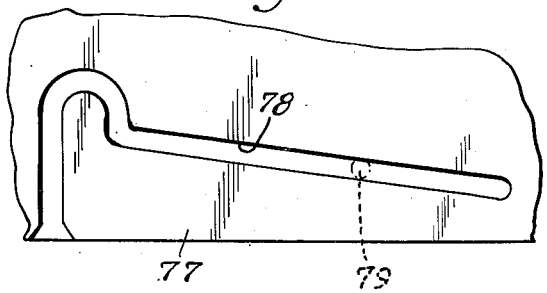
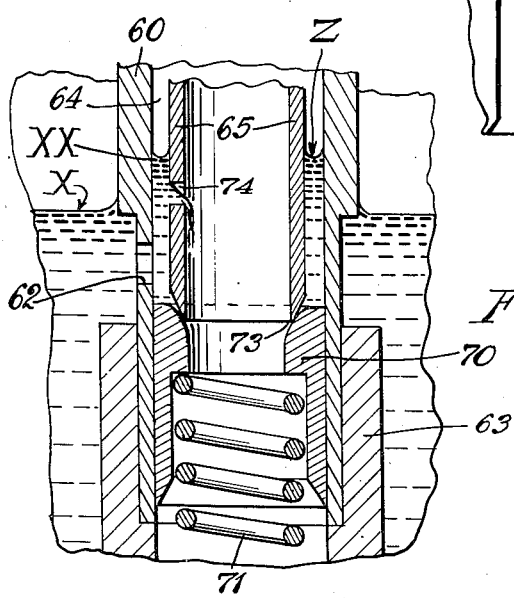
Inventor
James L. Breese
by Parker & Carter
Attorneys Patented Feb. 12, 1952

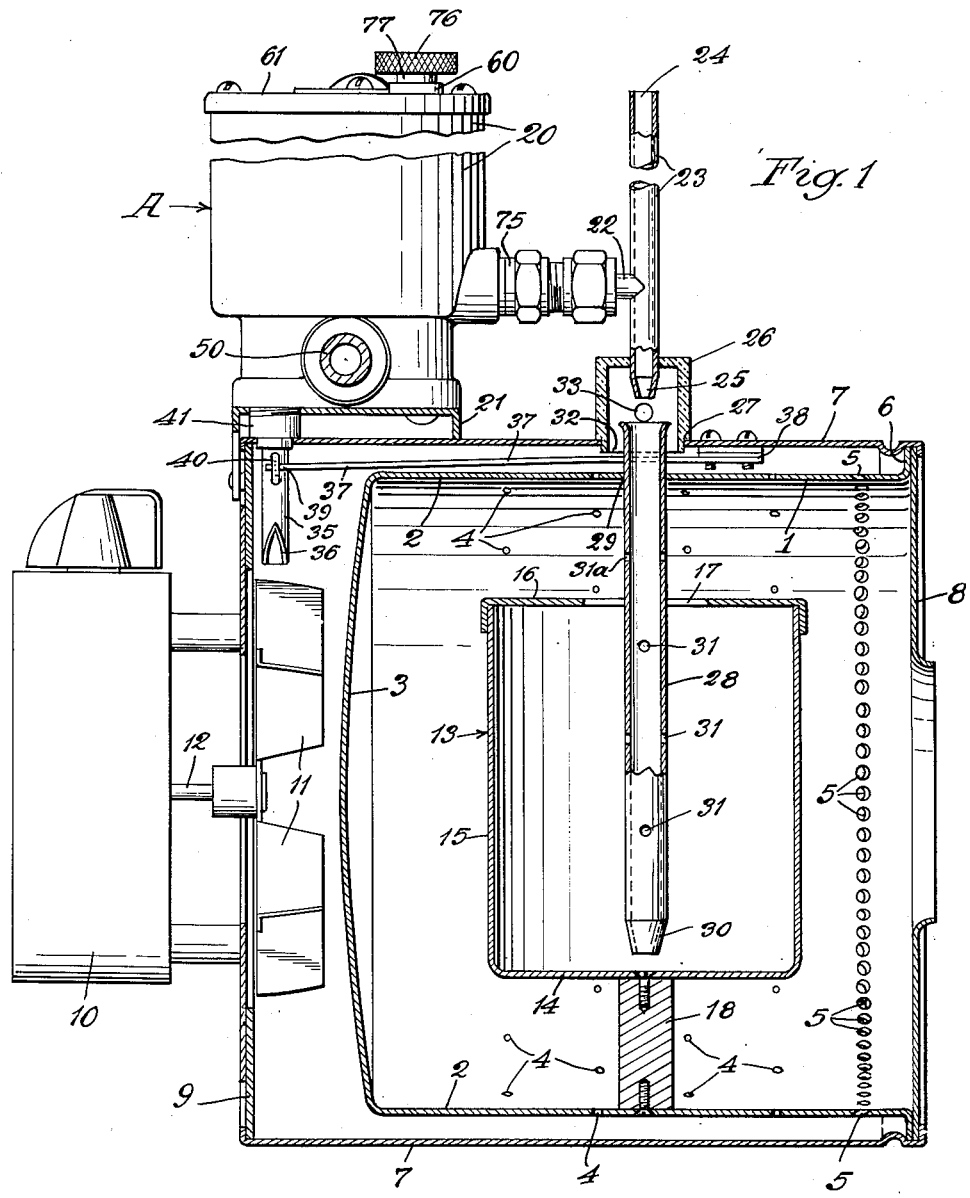

2,585,431

UNITED STATES PATENT OFFICE 2,585,431

METERING VALVE FOR LIQUID FUEL BURNERS

James L. Breese, Santa Fe, N. Mex., assignor, by mesne assignments, to Breese Burners, Inc., Santa Fe, N. Mex., a corporation of Delaware Application October 5, 1946, Serial No. 701,538

6 Claims. (Cl. 137—21)

My invention relates to an improvement in control means for controlling the rate of flow of liquids.

One purpose is to provide flow control means adapted to meter accurately at low flow rate.

Another purpose is to provide flow control means which meter accurately throughout a wide range of flow rate.

Another purpose is to provide liquid fuel flow control means for burners.

Another purpose is to provide improved safety means for a liquid fuel flow control.

Another purpose is to provide an efficient and compact flow control unit.

Another purpose is to provide a unit which may be efficiently used in connection with the related control of fuel delivery flow and of air flow to a vaporizing liquid fuel burner.

Other purposes will appear from time to time in the course of the specification and claims.

The invention is illustrated more or less diagrammatically in the accompanying drawings wherein:

Figure 1 is a vertical axial section with parts in side elevation;

Figure 2 is a plan view of control, with parts broken away and parts in section;

Figure 3 is a longitudinal section on the line 3—3 of Figure 2;

Figure 4 is a section on the line 4—4 of Figure 3;

Figure 5 is a partial section on an enlarged scale on the line 5—5 of Figure 3; and Figure 6 is a diagrammatic view of a generated cam slot.

Like parts are indicated by like symbols throughout the specification and drawings.

I have illustrated my control in connection with a horizontally axised pot type liquid fuel burner. It will be understood, however, that it may be used for other types of burner, and in connection with controlling the flow of liquids for other purposes. However, it may conveniently be illustrated in connection with its use for a control means for the particular burner shown in the drawings submitted herewith.

Referring to the drawings, and first to Figure 1, it illustrates a hydroxylating type pot 1, having a horizontally axised generally cylindrical side wall 2, and a closed end 3. The pot may have the usual primary air inlets 4, spaced circumferentially about the spot and at various distances from the ends of the pot. Any suitable arrangement of secondary air inlets 5 may be used. I illustrate, however, a single row of tilted inlets which are both larger and more closely spaced than the primary air inlets 4. The pot is shown as having an open end surrounded by an outwardly extending flange 6. The pot is mounted within the concentric outer housing 7. Its otherwise open end is party closed by the centrally apertured flame ring 8. The end wall or ring 9, of the housing 7, constitutes one side of a blower housing or casing and provides a means of support for the electric motor 10 which drives the blower or fan 11 on the shaft 12. The blower 11 delivers air against and about the closed end wall 3 of the pot.

Mounted within the pot is a vaporizing cup generally indicated as 13 and herein shown as having a bottom wall 14, a circumferential side wall 15, and a removable top wall 16 provided with any suitable gas outlet aperture 17. It will be understood that the wall 16 may, under some circumstances, be omitted, leaving the top of the cup open. The cup 13 may be supported by any suitable structure. I illustrate, for example, the support 18 extending between the pot wall 2 and the bottom 14 of the vaporizing cup.

The support 18 is preferably of heat conducting metal and of substantial mass. As will later appear, it is aligned below the area upon which drops of fuel will fall. It serves as an efficient means for transmitting or conducting heat to the area of contact between the falling drops and the bottom 14 of the vaporizing cup. It will be understood that any suitable fit or connection may be employed, sufficiently tight to prevent leakage. If necesary, welding can be employed.

An important feature of the invention is the delivery to the vaporizing zone, within the cup 13, of a controlled or metered supply both of liquid fuel for vaporization and of air in proper quantity and velocity to form, with the vaporized fuel, a dry gas. It is important that the liquid fuel be completely gasified. A convenient method or structure for supplying the air and fuel includes the below described control device or assembly generally indicated as A. It is effective, as will later appear, to maintain a proper ratio between the air and the liquid fuel supply. The control housing generally indicated at 20 may be mounted by any suitable bracket 21, preferably properly insulated, upon the outer casing or housing 7. It will be understood that liquid fuel is delivered through the lateral outlet duct 22 to the vertical discharge duct 23, aligned with said cup 13. The duct 23 is open to the atmosphere as at 24, at a level above the level of the liquid fuel in the control housing 20. It may terminate in any suitable nozzle 25 from which droplets of liquid fuel may be delivered. The nozzle 25, as a matter of convenience, may be surrounded by a sighting member 26 extending into or covering an opening 27 in the housing 7. Aligned with the nozzle 25, and extending upwardly into the interior of the sighting member 26, is the air tube 28 which passes through and fills any suitable aperture 29 in the pot wall 2 and extends downwardly through the aperture 17, into the interior of the cup 13. The cup may advantageously be made cylindrical, and concentric with the tube 28. The tube 28 has a restricted bottom discharge portion 30 which terminates a short distance above the bottom 14 of the vaporizing cup. It may be provided with a plurality of air outlets 31, located at intervals along its length.

The area of the space or gap 32, about the top of the tube 28, should be large enough to create a pressure within the interior of the tube 28, greater at the top than at the bottom, so that the air will flow downwardly through the tube 28. If the sighting member 26 is transparent, or has a transparent window, no sighting aperture is necessary. However, I may conveniently employ a sighting aperture 33. It may be advantageous to have some of the apertures 31 located above the top of the vaporizing cup, as shown at 31a.

As an essential factor in maintaining the fuel-air ratio, it is necessary to maintain on the surface of the fuel in the control unit a varying air pressure, proportional to the speed of the fan or blower 11. I obtain this result by employing an air inlet duct 35 which has an air intake aperture 36 located adjacent the tips or delivery edges of the blades of the fan or blower 11, the plane of the opening 36 being normal to the direction of air delivery from the tips of the blades. I may also employ the duct 35 as a safety means for cutting off further flow of fuel to the burner, as I will later point out in detail. Thus I illustrate the warping bar or bimetal strip 37, having one end secured, as at 38, to the inner face of the outer air housing 7. The free end 39 passes through a stirrup 40 on the duct 35. The duct 35 is slidably mounted in any suitable fitting 41, the upper opening of which is above the level of the fuel in the control A, this being shown at 42 in Figure 4.

It will be understood that when the burner goes out the warping bar 37 will move the duct endwise in its bearing or fitting 41. Any suitable actuating connection may be employed whereby, when the warping bar 37 moves the duct 35, any suitable linkage or connection, as shown at 42a, is actuated or employed to trip the suitable mechanism below described, in order to cut off further flow of liquid fuel.

In considering the details of the control mechanism or unit A, those parts which do not of themselves relate to the nozzle flow control claimed herein are only generally described. An outer housing 20 is provided, which includes or has any suitable liquid fuel inlet 50, which admits liquid fuel from a suitable source of supply. This fuel flows through any suitable strainer 51, to the float valve fitting 52. It passes the seat 53 and the needle valve and stem 54, which stem is suitably operated by the float 55 and its lever 55a. The interior of the space surrounded by the outer wall 20 constitutes a primary float chamber. A part of the interior, however, is separated by a dam 57, defining an open topped and normally empty float chamber. If a predetermined excess of fuel is admitted to the main float chamber, the surplus fuel will spill over the dam 57 and elevate the supplemental or safety float 56. An elevation of the float 56 is effective to raise or rotate the trip lever 58. When the lever 58 releases the trigger 58a, the needle valve stem 54 is urged into closing position and further supply of fuel is cut off. It will be understood that the linkage 42a is effective to obtain the same result, when the warping bar 37 raises the air duct 35, in response to a predetermined drop in temperature of the burner. Thus, in the event of burner failure, the further supply of fuel to the nozzle 25 is automatically cut off, just as if the float 56 had responded to an excess rise in liquid fuel level.

The actual metering of the supply of liquid fuel to the burner is obtained as follows:

The liquid level may be considered as indicated at X. The liquid surrounds a tube or standpipe 60. The standpipe is sealed to the cover 61 which in turn is sealed to the casing or housing 20, so that the air space Y, above the level of the liquid fuel in the control A, is sealed from the atmosphere, but responds to the pressure of air delivered upwardly along the duct 35 in response to rotation of the fan 11. It will be understood that there is no flow of air through the housing or through the space Y, a static pressure being provided. The standpipe 60 is provided with one or more duct apertures 62, which are located below the top level X of the liquid fuel. It will be noted that the lower end of the standpipe 60 interfits with and is in sealed relation with the upwardly extending support or guide tube 63. Oil flowing by gravity through the inlet or inlets 62 will rise in the cylindrical space 64, between the inner face of the standpipe 60 and the outer face of the valve cylinder or hollow stem 65. The interior of the valve stem is vented to the atmosphere. I show, for example, vents 66 and 68. The hollow sleeve or ring 70 is upwardly thrust by the compressed coil spring 71, the bottom of which abuts against the normally fixed abutment 72. The ring 70 is thus normally thrust upwardly, and seats against the lower edge 73 of the cylindrical valve stem 65 and moves it up as far as its adjustment permits. The upper adjustment of the movement of the valve stem will later be described. The oil which flows upwardly into the space 64 reaches the level X by gravity and rises somewhat above it by capillary action. It thus reaches the outlet aperture or apertures 74, rising completely above the upper, outer edge of any such aperture. Whatever oil is discharged through the aperture or apertures 74 is free to drop downwardly through the spring 71 and the fitting 75, and outwardly along the duct 22 to the vertical delivery duct 23. The valve stem 65 may be set by rotation of the knob 76, which controls a cylindrical portion 77, having a cam track 78, shown as receiving the fixed cam 79. Thus rotation of the knob 76 operates against the coil spring 71, which spring, through the ring 70, forces the hollow valve stem 65 up as far as is permitted by the cam arrangement above described. In addition, and in order to fix the desired relationship of the cam, I may employ an adjusting screw 80, in the knob 76, which abuts against the upper end of the solid portion 67 of the valve stem. It will further be understood that if I remove the knob and cam upwardly, and withdraw the valve stem or cylinder 65, the spring 71 is then effective to raise the ring 70 high enough to mask and close the aperture or apertures 62, thus preventing any further flow of liquid fuel to the burner. In order to permit removal of the knob 76, I may generate the cam slot in such fashion as to permit clearing the knob and its associated cylinders 77 from the cam pin 79 at either end of the possible camming excursion. I show in Figure 6, a generated cam slot which will operate satisfactorily, with a total arc of movement of the order of 90° to 100°.

The actual operation of the metering device is unconventional and entirely contrary to previous practice in the liquid fuel valve control art. Referring, for example, to the enlarged diagrammatic showing of Figure 5, and considering only single apertures, the outer aperture 62 is located definitely below the level X of the liquid, and therefore liquid will flow, under the influence of gravity, to the interior space 64, which is vented to the atmosphere. However, the actual liquid level in the space 64 is not at the X level indicated in dotted line, but is actually above the X level, as at XX. Thus the inner aperture 74, although it extends at least in part above the outside X level, is actually, on its outer face, located perceptibly below the capillary level within the space 64 indicated at Z. The liquid, in the aperture 74, defines an inclined surface having some of the characteristics of the angle of repose of solid particles, or of the surface of a liquid drop. In practice, the oil will ooze from the aperture 74 in a continuous flow. As the liquid head is raised, and the force of gravity is increased, the rate of liquid flow increases. In the usual flow of liquids through an orifice, the flow of liquid is proportional to the head.

With a suitable size orifice placed at the level of the liquid, it can be shown that the fuel increase will be proportional to the increase of air pressure, according to the laws governing the flow of liquids over a weir. Thus a very rapid increase of flow is obtained with a very small liquid head. To give a typical instance, when the desired flow for pilot fire is 2 cc. per minute, the head XX of the liquid above the bottom of the orifice is of the order of .01", the air pressure on the burner being about .02". As soon as the air pressure is increased to .04", which is sufficient for an effective low fire, the level XX rises to .03", and the effective width of the weir formed by the lower surface of the aperture 74 increases in such fashion that the rate of flow increases not only in proportion to the depth of liquid running over the weir, but also in proportion to the increase of the effective width of the weir up to the full diameter of the orifice 74. If the diameter of the orifice 74 is of the same order of magnitude as the pressure measured in inches of water, then, in the above example, where I employ an orifice of a diameter of .07", the level XX will reach the maximum width of the orifice with a change of level less than .035", one-half the diameter of the orifice. As soon as the level XX reaches the level of the horizontal maximum diameter of the orifice 74, any further increase in level will decrease the rate of increase. And, with the addition of .035" of pressure head, the orifice 74 will be completely submerged. The rate of flow through the orifice will then be proportional to the head. But, inasmuch as the air supply for combustion is also proportional to the increase in blower pressure, the rate of flow will at all times be a function of the head, and proportional to the flow of air to the burner. Both the flow of liquid fuel and the flow of air are responsive to the formula $Q=\sqrt{H}$, where Q is the quantity of liquid fuel or air, and H is the head.

In a system using a pilot and a blower to supply air for combustion, it is desirable to deliver the air at a pressure of between .02" and .03" W. C., so that the normal back draft down the chimney, due to wind or other causes, will not extinguish the small pilot flame. It is also desirable to operate the lowest heating flame at a rate of approximately 6 cc. to 8 cc. per minute, but at an air pressure of approximately .04" W. C. At this rate of combustion it is important that the air to fuel ratio be such that there is sufficient air for complete combustion, but not an excessive amount. This condition exists on up to the maximum rate of combustion for which the burner is designed.

But the conditions as to air to fuel ratio for the pilot stage are not the same. For pilot operation it is important to have sufficient air at the proper pressure for pilot combustion, and also to have a great deal of excess air, to care for fluctuating atmospheric conditions, and also to carry away the heat generated by the pilot.

It is significant that the above effect cannot be obtained if the inner orifice 74 is actually below the outside liquid fuel level X.

It will be realized that whereas I have described and illustrated a practical and useful invention, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of my invention are as follows:

I illustrate herein an improved flow control unit shown in connection with a vaporizing liquid fuel burner. Whereas I have illustrated the control as applied to a horizontally axised pot type burner, it will be understood that it can be applied to pot type burners of other types, or to entirely different problems.

In the particular use of the control device herein shown, I illustrate it in connection with the vaporizing cup 13, within a burner pot 1. The vaporizing cup receives all of the fuel which is burned in the pot. The motor 10 delivers the air necessary for the formation and combustion of the final fuel. The fan 11 also assists in the coordinated control of the air and fuel supply not only to the burner as a whole, but to the vaporizing cup.

By the liquid fued control means above described, a metered supply of fuel is delivered downwardly through and along the air tube 28. The droplets of fuel strike the bottom 14 of the cup 13, at or in alignment with the combined support and heat storage element 18. Air is supplied directly to the interior of the vaporizing cup or zone, by the tube 28, through its apertures 31 and 31a.

With respect to the control unit, the interior space Y is subjected, through the duct 35 and the inlet 36, to static pressure. The inlet 36 is located at the fan tips of the fan 11. This direct pickup of air pressure from the fan blades provides a positive pressure control.

It will be understood, by controlling the rate of air delivery of the fan 11, I at the same time increase the supply of air for combustion, and increase the rate of flow of liquid fuel to the vaporizing zone. Similarly, a drop in the air delivery rate results in a reduction of the rate of liquid fuel delivery for vaporization. The result is a highly efficient fuel forming and burning mechanism and method, which results in a clean fire and a minimum deposit of free carbon.

It should be kept in mind that at low feed the space between the members 69 and 65, in connection with the aperture 74, acts as a trough, in the sense that the upper edge of the aperture does not restrict the flow. It is only as the oil level raises, that the upper edge of the aperture 74 drops below the level of the oil, causing the orifice to become a restriction.

In considering the mode of operation of the present control, as will be clear from Figure 5, the main body of fuel, with its top surface X, is in communication with the space Z through an aperture or apertures 62, which are located entirely below the level of the fuel in the outer chamber. The actual metering aperture or apertures 74 can extend above or be located above the level X, as shown in Figure 5. The parts and apertures are so proportioned that at least one of the apertures 74 is positioned so that the hydrostatic oil level is below the top of the orifice but above the bottom of the orifice.

The main purpose of the valve, as shown in connection with the present burner, is to regulate the amount of fuel in relation to the air consumed by the burner. When the valve parts are in the operating position, in which they are shown in Figure 5, the valve cylinder 65 holds the ring 70 downwardly against the spring 71, unmasking the aperture or apertures 62. Oil can thus flow through the apertures 62 and upwardly in the space Z.

It should be kept in mind that the knob 76 may be rotated to vary the height of the apertures 74. Their height may thus be varied with respect to the hydrostatic level of the oil.

An advantageous feature of the structure is that in the event it is necessary to clean the valve, or to have access to the interior of the valve, the knob structure may be readily upwardly removed, by clearing the slot 78 from the pin 79. But as the knob is upwardly removed, the spring 71 moves the ring 70 into closed position, thereby masking the apertures 62. The screw 80 is an additional adjusting means for setting the height of the cylinder 65, and thus of the aperture or apertures 74.

I claim:

1. In a control device for liquid fuel burners, a container adapted to hold a body of liquid fuel, means for metering the flow of liquid fuel from said container including a generally upright standpipe in said container having an aperture therein positioned below the normal level of liquid fuel in the container, and a generally concentric inner wall within said standpipe, said standpipe and inner wall defining a capillary space, said inner wall having a metering aperture therein positioned above the level of liquid fuel in the container and extending below the top level of the capillarily elevated liquid in said capillary space.

2. The structure of claim 1 characterized by and including means for adjusting the inner wall in relation to the level of liquid fuel in the container and for thereby varying the relation of its metering aperture to the level of liquid fuel in the container.

3. In a control device for liquid fuel burners, a container adapted to receive a body of liquid fuel, and means for metering the flow of liquid fuel from said container including upwardly extending walls in said container defining a capillary space, the exterior of one of said walls being in contact with the liquid fuel in said container, said wall having an aperture therein positioned below the normal level of liquid fuel in the container, the second wall having a metering aperture therein positioned above the level of liquid fuel in the container and extending below the top level of the capillarily elevated liquid in the capillary space between the two walls, and an outlet duct element adapted to receive the liquid fuel which escapes through the metering aperture in said second wall.

4. The structure of claim 3 characterized by and including means for adjusting the second wall for thereby varying the relation of its metering aperture to the level of liquid fuel in the container.

5. The structure of claim 1 characterized in that the inner wall is vertically adjustable within the standpipe and including an adjustable abutment for the upper end thereof and yielding means for urging the inner wall upwardly against said abutment.

6. The structure of claim 1 characterized by and including means for adjusting the inner wall in relation to the level of liquid fuel in the container and for thereby varying the relation of its metering aperture to the level of liquid fuel in the container, said adjusting means including an exteriorly accessible manually operable member.

JAMES L. BREESE.

REFERENCES CITED

The following references are of record in the file of this patent:

UNITED STATES PATENTS

| Number | Name | Date |
|---|---|---|
| 1,054,533 | Greiner | Feb. 25, 1913 |
| 1,344,827 | Shafer | June 29, 1920 |
| 2,209,442 | Buffington | July 30, 1940 |
| 2,367,038 | Martin | Jan. 9, 1945 |